United States Patent
McPhail

[15] 3,702,967
[45] Nov. 14, 1972

[54] ELECTRONIC TEST SYSTEM OPERABLE IN TWO MODES

[72] Inventor: James H. McPhail, Santa Clara, Calif.

[73] Assignee: American Micro Systems, Inc., Santa Clara, Calif.

[22] Filed: May 10, 1971

[21] Appl. No.: 141,795

[52] U.S. Cl..................324/158 D, 323/17, 323/40, 324/158 T
[51] Int. Cl. ...........................................G01r 27/00
[58] Field of Search...........324/158 R, 158 D, 158 T; 323/17, 22 T, 22 SC, 40, 9, 4

[56] References Cited

UNITED STATES PATENTS

| | | | |
|---|---|---|---|
| 2,934,705 | 4/1960 | Stetzler | 324/158 D |
| 3,358,232 | 12/1967 | Dillon | 324/158 D |
| 3,303,412 | 2/1967 | Gately | 323/4 |
| 3,538,423 | 11/1970 | Goleniewski | 323/40 X |
| 3,611,115 | 10/1971 | Siebers | 323/40 X |

*Primary Examiner*—Gerald Goldberg
*Attorney*—Owen, Wickersham & Erickson

[57] ABSTRACT

A parametric test system that will provide a forcing current at a predetermined level in one mode or a forcing voltage of a constant potential in another mode, particularly adapted for testing semiconductor devices. The circuit comprises a first amplifier means or voltage compliance amplifier which is an amplifier that produces the voltage compliance necessary for high voltage drive and measurement. The output of this compliance amplifier is controlled by a second amplifier means or control amplifier, both amplifiers being connected between current sources operating at negative and positive voltage levels, and this output is connected to one of two test terminals adapted for connection to the junction of a device under test. The control amplifier is "floating" in that it is referenced to one test terminal so that in the current forcing mode it produces an output that keeps driving the compliance amplifier to a different voltage level which in turn increases current flow at the test terminals. When current through the test junction reaches the predetermined level, set by means of an adjustable resistor, the control amplifier provides the proper output and the system stabilizes, with the first amplifier means maintaining the compliance voltage required. For voltage forcing, an external power source supplies voltage via the control amplifier to one test terminal. As leakage current tries to flow through the junction of the device under test, the potential at the test terminals change and cause an imbalance at the inputs to the control amplifier which changes its output and keeps driving the compliance amplifier to a different voltage level, until it is sufficient to cause leakage current to flow through the device under test. A measuring resistor is provided in the output of the compliance amplifier to facilitate access to test values.

19 Claims, 3 Drawing Figures

PATENTED NOV 14 1972
3,702,967
SHEET 1 OF 2
FIG_1
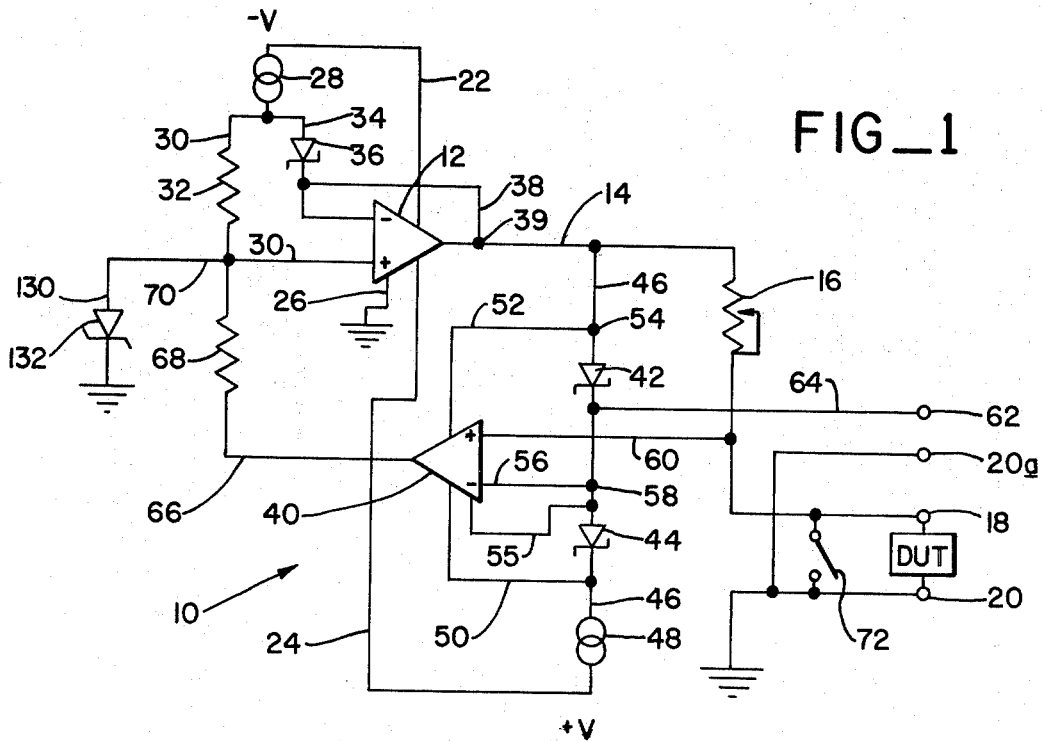
FIG_2
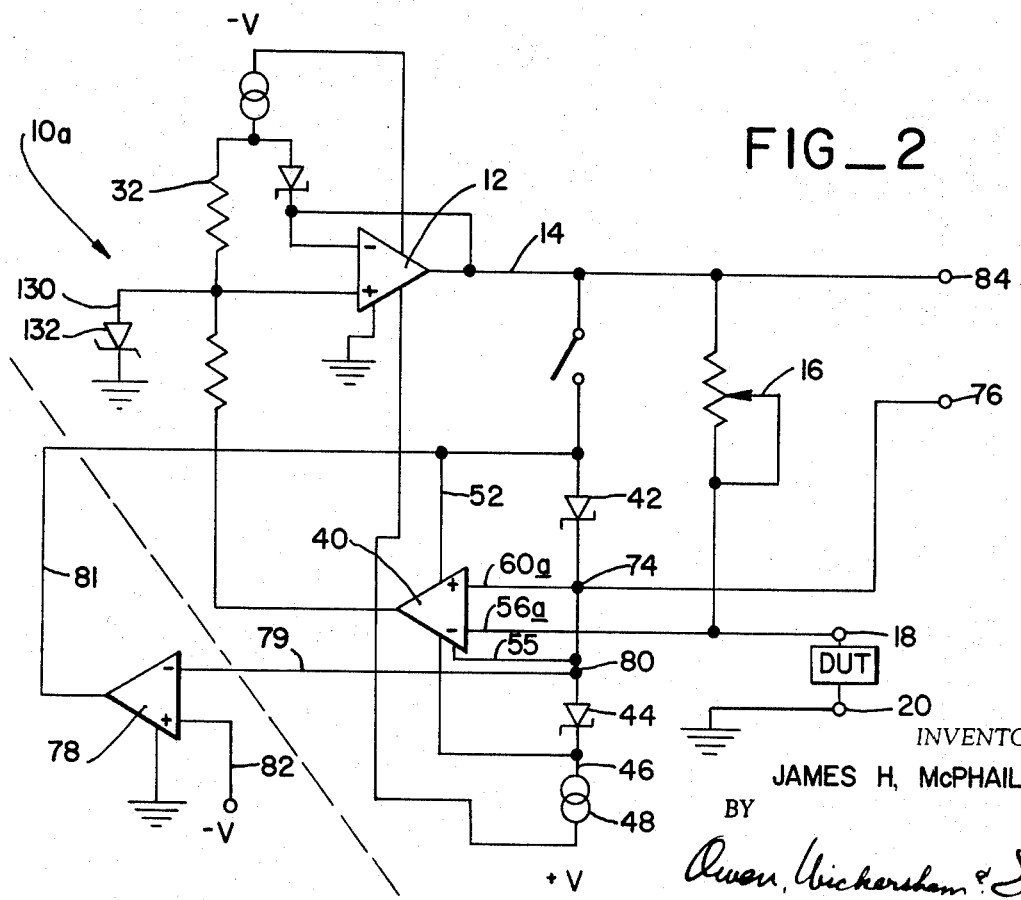
INVENTOR.
JAMES H. McPHAIL
BY
Owen, Wickersham & Erickson
ATTORNEYS

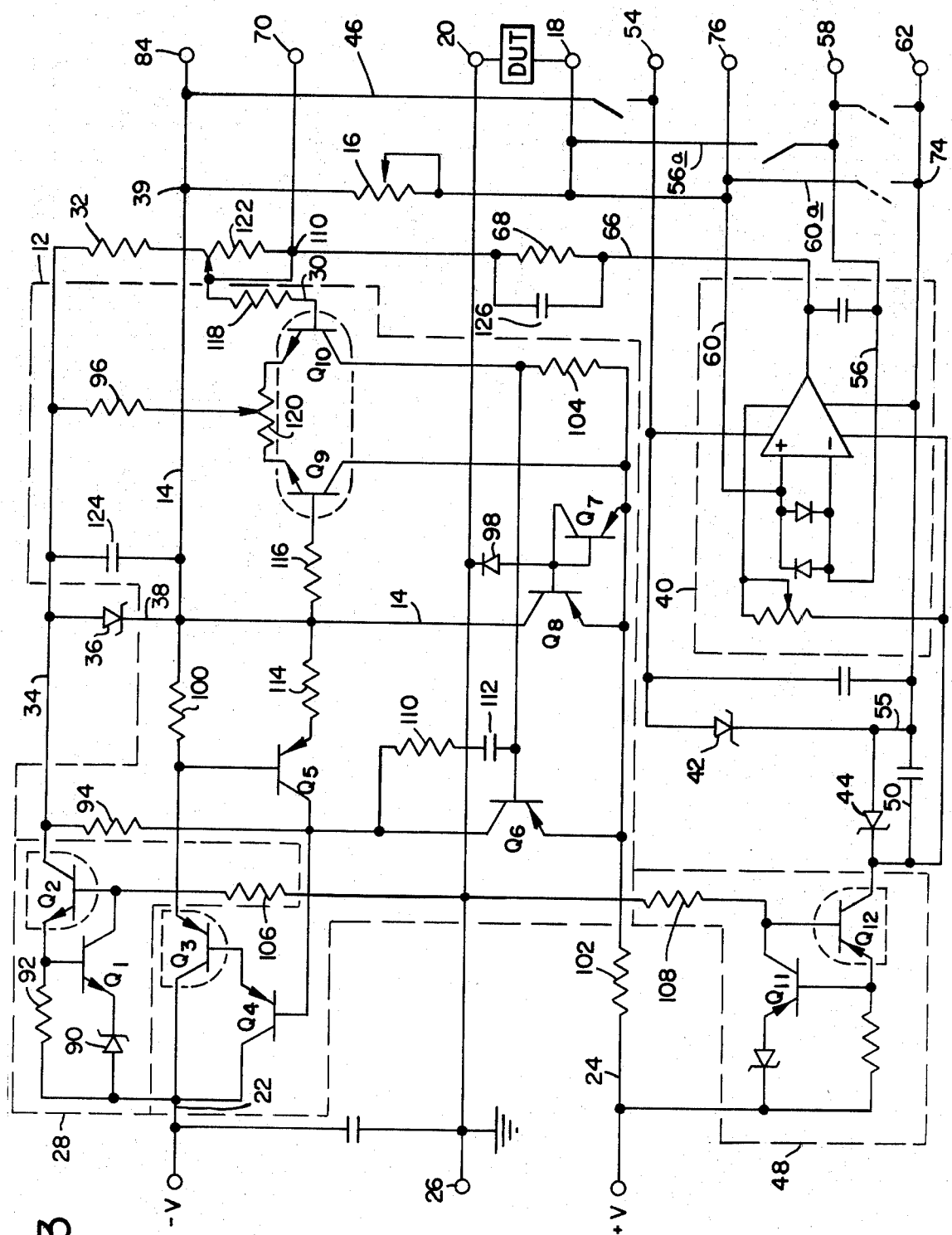
FIG_3

ELECTRONIC TEST SYSTEM OPERABLE IN TWO MODES

This invention relates to an electronic apparatus for forcing electrical current or voltage at predetermined levels to facilitate the testing of electronic components.

Semiconductor devices must be tested within certain electrical parameters to determine whether they meet design specifications or have defects. For example, on multiterminal devices it is necessary to check each pin to see if threshold voltage requirements are satisfied, and also whether any current leakage occurs above acceptable limits within the device when activated. Heretofore, a problem arose in providing a practical and reliable test apparatus capable of operating in one mode to force current at precisely a predetermined level to enable the measurement of the voltage required to maintain current at that level, and of operating in another mode to provide and maintain a forcing voltage to facilitate the measurement of leakage current.

Another problem was to provide apparatus capable of providing the aforesaid test functions on semiconductor devices rapidly and accurately. The later requirement was complicated by the need to eliminate extraneous current values and biasing effects to assure precise electrical values at test terminals.

It is therefore one object of the present invention to provide an electronic circuit that solves the aforesaid problems and is particularly adaptable for use as a parametric tester for multi-junction semiconductor devices.

Another object of the present invention is to provide a circuit that will accomplish voltage forcing with current reading and current forcing with voltage reading for use in testing semi-conductor devices that is simple, compact, has relatively few components and is adaptable for manufacture on a single printed circuit card.

Another object of the present invention is to provide a circuit for parametric testing that will produce outputs with precision and reliability.

More specific objects of the present invention are to provide a parametric testing circuit that will provide a relatively high voltage compliance for a current source; that has full self-limiting control or in other words an automatic compliance limit; and that has a feedback control loop which "floats" within the system in that it is referenced to the output of the system rather than to ground to allow forcing a current with respect to an actual ground rather than a virtual ground, thereby enabling other equipments to be readily referenced to the test apparatus in systems applications.

Another object of the present invention is to provide a circuit particularly adaptable for producing outputs useable in the parametric testing of semiconductor devices that can be readily adapted to either N-channel or P-channel operation by changing NPN transistors to PNP transistors and vice versa and reversing the polarity of diodes.

The aforesaid objects are accomplished by a circuit comprising a first operational amplifier or voltage compliance amplifier which is an amplifier that provides the voltage compliance necessary for high voltage drive and measurement. Its output is controlled by a second operational amplifier or control amplifier, both of which are connected between a pair of current sources operating at negative and positive voltage levels. Depending on the operating mode, the circuit provides either a predetermined current flow through a pair of output terminals (current forcing mode) or a predetermined voltage potential across the output terminals to facilitate the measurement of leakage current through the junction (voltage forcing mode). The compliance amplifier has a control loop comprising the first current source, a resistor and a zener diode that are virtually connected in parallel by being attached to the inverting and non-inverting inputs of the compliance amplifier. The resistors is connected to receive a feedback output from the control amplifier, which output is produced when the predetermining level of current flow is reached at the test terminals. The control amplifier is "floating" in that it is reference to the voltage level at one test terminal. Its control loop, connected to its inverting and non-inverting inputs, includes a pair of zener diodes connected in series in a lead from the second current source and in parallel with the control amplifier. An adjustable current measuring resistor is virtually in parallel with one of the zener diodes to provide a means for measuring test voltages and to determine test current values. In the current forcing mode with a test junction connected to the test terminals of the circuit, the control amplifier produces an output when current through the test junction reaches the predetermined level. This output is fed back to the compliance amplifier to cause it to produce the necessary voltage to stabilize the system so that the voltage necessary to maintain the current flow can be measured from other terminals of the circuit. In the voltage forcing mode, an external power source supplies a voltage to the control amplifier and thus to one test terminal. With a device under test connected to this terminal a leakage current will try to flow from the ground terminal to it and through the measuring resistor. As the leakage current tries to flow, the potential at the test terminal changes and causes an imbalance at the inputs of the control amplifier. This provides a change in its output which drives the compliance amplifier to a potential that causes the voltage potential across the measuring resistor to increase until the leakage current will flow. The value of the leakage current may be readily determined by voltage across the measuring resistor.

Other objects, advantages and features will become apparent from the following detail description presented with the accompanying drawings, in which:

FIG. 1 is a schematic diagram of a testing device embodying the principles of the present invention and arranged for the current forcing mode;

FIG. 2 is a schematic diagram of my testing device arranged in the voltage forcing mode; and FIG. 3 is a detailed electrical circuit diagram of a testing device according to the present invention.

As shown in block diagram form in FIG. 1 a circuit 10 embodying the principles of the present invention and arranged in a current forcing mode comprises a first operational amplifier 12 which may also be referred to as the voltage compliance amplifier. The output of this amplifier is supplied through a lead 14 and an adjustable range resistor 16, which in this mode is a current determining resistor, to an output terminal 18. Another terminal 20 is provided which is connected to ground potential. These terminals 18 and 20 are adapted for connection to the device under test.

The compliance amplifier 12 is connected by a lead 22 to a negative voltage source and by a lead 24 to a positive voltage source thereby providing its operating power. This amplifier is referenced to ground by a lead 26. The negative voltage also drives a current source 28 connected to a control loop for the amplifier 12. This loop comprises a lead branch 30 containing a current determining resistor 32 and connected to the non-inverting (+) input to the amplifier 12. A lead branch 34 containing a zener diode 36 is connected to the inverting (−) lead of the amplifier 12. A feedback lead 38 is connected from the output lead of the amplifier 12 to a junction with the branch lead 34 between the zener diode and the inverting input.

A second operational amplifier 40 is provided in the circuit which will hereafter be referred to as the control amplifier. Power to this amplifier is controlled by a pair of zener diodes 42 and 44 which are connected in series in a lead 46. This latter lead extends from a second current source 48 that is driven by the plus voltage; the other end of which is connected to the output lead 14 from the compliance amplifier 12. A first power lead 50 extends to the control amplifier 40 from a junction with the lead 46 between the zener 44 and the current source 48. A second power lead 52 extends from the amplifier 40 to a junction 54 with the lead 46 between the zener 42 and the junction with the amplifier output lead 14. The control amplifier 40 is "floating" in that it is referenced by means of a lead 55 to a junction with the lead 46 between the two zener diodes 42 and 44. Therefor the amplifier is referenced to a varying potential in that it varies in accordance with the potential of the output terminal 18. The inverting (−) input is also connected by a lead 56 to a junction 58 with the lead 46 between the zeners 42 and 44. The non-inverting (+) input to the control amplifier 40 is connected by a lead 60 to the lead 14 between the resistor 16 and the output terminal 18. A first test measuring terminal 62 is connected by a lead 64 to the lead 46 between the zeners 42 and 44 and another ground terminal 20a is provided which may be connected to the same ground as the terminal 20. The output from the control amplifier 40 is supplied through a lead 66 containing a load resistor 68 to a junction 70 with the lead 30.

The circuit 10, as used in semiconductor parametric test apparatus will provide a fixed known value of current flow at the output terminals 18 and 20. Thus, in a typical test operation these terminals may be connected to preselected terminals of a device under test (DUT) and current is applied at these terminals with the proper compliance voltage. For example, to determine the threshold or breakdown voltage ($V_T$) of a P-N junction in a metal-oxide-silicon (MOS) semiconductor device, the terminal 18 would be connected to the gate and drain of the device under test, and the terminal 20 would be connected to its source. The desired current flow (e.g. 1 micro-amp) that is to be established and maintained, is preset by adjustment of the range resistor 16 in any suitable manner. This preset current level is maintained by providing a negative compliance voltage from the amplifier 12 through the resistor 16 to the output terminal 18 as will now be explained. When the circuit is turned on, the current trying to flow through the resistor 16 from the ground terminal 20 cannot flow initially across the junction to the terminal 18 because the $V_T$ or threshold voltage of the test junction of the DUT has not been reached. The current also cannot flow through the lead 60 to the non-inverting (+) junction of the amplifier 40 because this has been established as a high impedance input. This condition causes the voltage compliance amplifier 12 to go "negative". At this point the amount of control current flowing in the resistor 32 in the control loop for the amplifier 12 is not sufficient to hold the loop stable. This causes an imbalance between the inverting and non-inverting amplifier inputs which drives the output of amplifier 12 negative in lead 14. Thus, the compliance amplifier 12 is driven negative until it reaches the $V_T$ value of the junction under test plus the voltage drop of the resistor 16 which is substantially the same as the voltage drop across the zener 42. For example, assume that the $V_T$ voltage is 6 volts. When that voltage is reached at the terminal 18, then the preset current (e.g. 1 microamp) flows through the junction under test. When the circuit 10 was energized, operating current for the control amplifier 40 was supplied by current source 48 through leads 50 and 52. Any current in excess of that specified for amplifier 40 passes through lead 46 into zeners 44 and 42. The total current originating from the source 48 passes through the junction 54, through lead 14 and into the output of amplifier 12. As stated previously, the amplifier 40 is referenced to lead 46 at a junction between the zener diodes 42 and 44. Thus, these zeners are controlling the plus and minus supply voltages to the amplifier within the operating limits. With the amplifier in its operating mode and before a device is tested, the terminals 18 and 20 are shorted in a standby condition. This may be accomplished by a suitable switch 72 in a connector between the terminals. This causes the entire circuit 10 to assume a balanced condition. That is, the voltage difference between the inverting and non-inverting inputs of amplifier 40 is essentially zero and stable and this causes its output to source a steady current (e.g. 1 milliamp) which is required by the resistor 32 and zener 36 for a stable condition to exist. This is because zener 36 is virtually across the resistor 32 since the voltage difference between the inverting and non-inverting inputs of the operational amplifier 12 is essentially zero and stable. This causes amplifier 12 to maintain at its output junction 39 the voltage value of zener 42 only because the terminals 18 and 20 are shorted at this point. This same output voltage from the amplifier 12 appears across the current determining or range resistor 16, thereby establishing the desired predetermined current flow at the test terminals 18 and 20. Now, the device to be tested is placed in parallel with the short between the test terminals 18 and 20. When the short is removed by opening the switch 72, current wants to flow through the device under test, thereby causing terminal 18 to go negative with respect to the terminal 20. Instantaneously, this causes a voltage imbalance between the non-inverting and inverting input terminals of the control amplifier 40 thereby causing its output to stop sourcing current. This imbalance remains until the breakdown or $V_T$ voltage of the device under test is reached, at which point the forced predetermined current flows through it and the control amplifier 40 again sources a control current for resistor 32, causing the system to return to the stabilized state. At this point, the amplifier 12 must supply the same zener voltage at junction 39 plus the compliance voltage or threshold voltage $V_T$ required to force the desired current into the (DUT). Now, as this current is forced at a constant level the compliance voltage measurement may be made conveniently at the terminals 62 and 20a, since it is virtually the same voltage as across output terminals 18 and 20, and this voltage is the $V_T$ or threshold voltage of the device under test.

In the "voltage forcing mode" some alterations are made in the circuit 10 to provide a modified circuit 10a, as shown in FIG. 2. First, the input terminals of amplifier 40 are reversed so that its non-inverting input lead 60a now makes a junction 74 with the lead 46 and then terminates at a terminal 76. The inverting input lead 56a is connected directly to the test terminal 18. In addition, the lead 46 to the output of amplifier 12 is opened as by a switch so that it does not connect with the output of the compliance amplifier 12. An outside power source such as an operational amplifier 78, is also supplied which is referenced to ground. Its inverting (−) input is connected by a lead 79 to a junction 80 in lead 46 between the zeners 42 and 44. The output lead 81 from the amplifier 78 is connected to the lead 52 from the amplifier 40 and provides a current path for the current source 48. When an external negative voltage source (e.g. −15 volts) is applied to the non-inverting (+) input lead 82 of amplifier 78, the same voltage exists at terminal 18. This is because the inverting and non-inverting inputs of amplifier 78 are virtually the same or shorted, and thus its input voltage exists at junction 80. Since this junction is tied to junction 74 of the non-inverting input of amplifier 40 the same voltage must also be at this point, and since the input terminals of the amplifier are virtually the same or shorted, the voltage at terminal 18 is the same as the input to the amplifier 78. Before the device under test is placed between terminals 18 and 20 there is no current trying to flow in the resistor 16. With a steady voltage applied to amplifier 78, the non-inverting (+) and inverting (−) input terminals to amplifier 40 are zero and stable and it is sourcing a 1 milliamp output to the current determining resistor 32 for controlling the compliance amplifier 12. The non-inverting (+) and inverting (−) terminals of amplifier 12 are therefore virtually zero and stable and the output of amplifier 12 is also supplying the same voltage as that supplied at lead 82 to amplifier 78 since there is no current flowing through the resistor 16. Now, as soon as a device under test is placed across terminals 18 and 20, a current instantaneously attempts to flow through the resistor 16 as determined by the leakage of the device under test. This causes the terminal 18 to go more positive with respect to what it was compared with the ground terminal 20. This causes an imbalance at the non-inverting (+) and inverting (−) inputs to amplifier 40 and thereby causes its output too reduce the amount of current it is sourcing. The reduced current flow in resistor 32 causes an imbalance in the non-inverting (+) and inverting (−) inputs to the amplifier 12, thereby causing its output to go more negative in the same manner as in the current forcing mode. This increase in negative voltage tends to allow the leakage current in the device under test to flow in the resistor 16, and the imbalance in the control loop of amplifier 12 continues until a voltage is reached across resistor 16 that will allow leakage current to flow. When this occurs, the circuit 10a returns to its balanced stable state, and a measurement of voltage across the terminal 76 and a terminal 84 on the output of the amplifier 12 may be made which is directly related to the leakage current in the device under test.

In FIG. 3, one specific embodiment of electrical circuitry is shown for carrying out the aforementioned principles of my invention. This circuitry can be made entirely with solid state devices and packaged on a single printed circuit card using conventional fabrication techniques. In this embodiment, the current source 28 is comprised of a pair of transistors Q1 and Q2 that operate to provide a stabilized current to the amplifier 12. The emitter of transistor Q1 is connected to a zener diode 90. Its base is connected to a resistor 92 in parallel with the zener and the emitter of transistor Q2. Thus, the zener voltage of diode 90 plus the emitter base of transistor Q1 forms a voltage that is placed across resistor 92 to cause current to flow in the emitter of transistor Q2. This same current flows in the collector of transistor Q2 as an output to the amplifier 12 in the lead 34.

The current source 48 operates in the same manner as current source 28, with a pair of transistors Q11 and Q12 of different polarity since this current source is connected to a positive voltage. Here, the output of transistor Q12 goes to the zener diodes 44 and 42 and thus to the control amplifier 40, in the manner previously described with respect to the diagrams of FIGS. 1 and 2.

The compliance amplifier 12, as shown includes a pair of transistors Q9 and Q10 which have base connections that form its non-inverting and inverting input terminals. The output of the amplifier 12 shown as the junction 39 is controlled by an output device, namely a transistor Q3 which is connected in a driving arrangement through its base to the emitter of a transistor Q4 whose base is connected to the collector of another transistor Q6.

The output of the current source 28 supplies a load resistor 94, the zener diode 36, a emitter resistor 96 for the transistors Q9 and Q10 and the current limiting resistor 32 which are parallel connected to receive the current necessary for proper operation.

The transistor Q6, the drive to the output stage of the amplifier 12, is base-emitter connected to the input differential pair of transistors Q9 and Q10. It is necessary for the amplifier 12 to reach zero voltage with a load on the system. To provide this function a pair of transistors Q8 and Q7 are used in combination with a diode 98 to furnish a current into the output junction 39 of amplifier 12 in order for it to have a current load at all times. A transistor Q5 has a current limiting function and senses the current in the output line 14 from transistor Q3 through a resistor 100. In the lead 24 from the positive voltage source is a resistor 102 that supplies bias for the transistors Q6, Q8, Q7, the diode 98 and a resistor 104. This resistor 102 also provides a current path from the current source 28, through the transistor Q6 and the resistor 94. When the current gets large enough to cause a diode drop across the resistor 100 the transistor Q5 starts to conduct, and takes current away from transistor Q6. This limits the drive into the output devices Q3 and Q4 but maintains the current that is presently in the resistor 100. Current also flows through the zener 36 and transistor Q8; it also flows through the resistor 96 and the differential transistor pair Q9 and Q10; and it also flows as control current through the resistor 32 to the amplifier 40. The function of the other elements of the circuit may be briefly described as follows. A resistor 106 serves as a bias resistor for the transistor Q2 and a resistor 108 is a biasing resistor for the transistor Q12. A resistor 110 and capacitor 112 in series provided a frequency compensating function between the collector and base of transistor Q6. A resistor 114 is connected to the emitter of transistor Q5 for current limiting. Another pair of resistors 116 and 118 are provided in the base connection of transistors Q9 and Q10 as parasitic suppressors and yet another resistor 120 between their emitters provides a balance capability. An adjustable resistor 122, provided in series with and as part of resistor 32 is used to adjust the control current to the desired level (e.g. 1 milliamp). A capacitor 124 is provided in parallel with the zener diode 36 as a bypass and a capacitor 126 connected in parallel with the resistor 68 serves as a frequency compensating element.

As indicated, various leads to output terminals on the circuit of FIG. 3 are interconnected by a suitable switching means so that the circuit can be placed in either a current forcing mode as shown in FIG. 1 or a voltage forcing mode as in FIG. 2. In the drawing shown these switches are set so that the circuit will provide current forcing and its operation in this mode may be described briefly as follows. Assuming that the current sources 28 and 48 are in operation with a DUT between the terminals 18 and 20, current is supplied to the transistor Q10 of the differential pair in amplifier 12 through the junction 70. If the control amplifier 40 is producing an output, it is supplied through the lead 66 to junction 70 through the resistor 68. The amplifier 12 functions so that a stable condition is produced whenever there is zero volts between the base of transistor Q10 and transistor Q9, that is, no imbalance and no tendency for the amplifier to swing in any direction. However, with the DUT between the terminals 18 and 20, the imbalance is created at the + and − inputs of amplifier 40. This causes the control current in lead 66 to reduce, thereby causing an imbalance in the bases of transistors Q9 and Q10 of amplifier 12. This imbalance causes the voltage at the junction 70 to go more negative causing the output at junction 39 to also go negative. This transition to a more negative output is accomplished in the following manner. When the voltage at terminal 70 goes more negative, Q10 conducts less causing Q6 to conduct less and thereby causing more current to flow into the base of Q4. This causes Q3 to conduct more current, drawing terminal 39 close to the negative supply voltage (−V). Now, with terminal 39 going more negative, terminal 58 will follow since it is shorted to terminal 39 through the zener 42. Since there is a virtual connection between the + and − inputs to the amplifier 40 the voltage at terminal 18 also goes more negative and this action continues until the desired current flows in resistor 16. Until this occurs there exists an imbalance at the + and − inputs of both amplifiers 12 and 40 causing the voltage at terminals 39 and 18 to go negative in the manner just described. When the desired current flows in resistor 16, the imbalance in the + and − inputs to amplifier 40 no longer exists and its output stabilizes amplifier 120 so that it continues to provide the compliance voltage necessary to maintain or force the desired current level. In the course of testing devices it often is desirable to limit the compliance obtainable from the circuit. For example, it may be determined that the breakdown voltage occurs in the range of 30 volts for a good device, but it is essential not to exceed 50 volts at the device terminals so as to avoid damaging it. Limiting the compliance voltage to a safe level can be accomplished by applying the one milliamp control current from another source directly to the terminal 70 when terminal 18 has reached 50 volts. For example, as shown in FIG. 1, a lead 130 connected to terminal 70 contains zener diode 132 connected to ground, and this zener is rated at the limit voltage (e.g. 50 volts) plus the voltage rating of zener 42. Thus, in operation, if the voltage breakdown is not reached at terminal 70 within the desired safe limits, the current determining resistor 32 will draw current through the zener diode 132 rather than from the operational amplifier 40. This feature enables the present circuit to provide its test operations on large numbers of semiconductor devices within safe limits and thereby greatly increase its versatility.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An electronic test system for forcing a constant current through a device under test comprising:

a pair of test terminals adapted for connection to the junction terminals of a device under test, one of said terminals being connected to ground potential;

first amplifier means for providing a compliance voltage having a pair of differential inputs and an output;

an adjustable resistor connected between the output of said first amplifier means and said test terminal that is ungrounded;

a first current source connected to said inputs of said first amplifier means;

second amplifier means also having a pair of differential inputs, one of which is connected to said ungrounded test terminal, and an output connected to said first current source and one said input of said first amplifier means;

a second current source connected to said second amplifier means;

and means connected to the output of said first amplifier means for controlling the voltage supplied to said second amplifier means, thereby causing it to vary its output and in turn control the output of said first amplifier means; whereby when said adjustable resistor has been preset to a predetermined value, said system will stabilize automatically when said first amplifier means arrives at a point where it supplies the compliance voltage necessary to force the predetermined current level through the device under test.

2. An electronic test system for providing and maintaining a highly accurate source of current and voltage at preselected levels to devices under test, said system comprising:

output terminal means adapted for connection to a device under test;

means for supplying a predetermined, selectable output current, said current supply means including a first control amplifier means having its input connected to one of said output terminals;

a second amplifier means having its input electrically engaged to the output of said control amplifier, said first and second amplifier means being so connected that the system is in equilibrium when the output of said second amplifier means is grounded;

current adjusting means interconnecting the output of said second amplifier means and the input to said first amplifier means;

means for supplying a predetermined, selectable output voltage; and switch means connected to said current supply means, said voltage supply means, and said output terminal means such that either said output voltage or said output current is impressed upon said output terminal means and thereby supplied to said device under test.

3. The system of claim 2 further characterized by:

means for limiting the output voltage of said second amplifier means, said limiting means connected to the input to said second amplifier means and adapted to maintain the voltage supplied thereto below a predetermined level.

4. The system of claim 3 further characterized by:

connector means interconnecting said output terminal and said control amplifier means so that said amplifier is referenced to the voltage on said output terminal.

5. The system of claim 4 wherein said output means comprises:

a pair of terminals, one of which is connected to said current adjusting means and the other is grounded; and switching means interconnecting said terminals.

6. The system of claim 5 wherein said current control means comprises a variable resistor.

7. The system of claim 6 wherein said limiting means comprises a zener diode.

8. An electronic test system for providing and maintaining a highly accurate source of current and voltage at preselected levels to devices under test, said system comprising:

output terminal means adapted for connection to a device under test;

a current source for supplying a predetermined, selectable output current;

means for supplying a predetermined, selectable output current;

means for supplying a predetermined, selectable output voltage including a control amplifier;

a compliance amplifier providing voltage at a predetermined compliance level;

feedback means interconnecting the output of said compliance amplifier with the input of said control amplifier such that the amplifier pair is stable;

means connecting the output of said compliance amplifier to said output terminal means; and an outside voltage source connected to the input of said control amplifier such that the voltage supplied to the input of said outside voltage source also appears at said output terminal means.

9. The system of claim 8 further characterized by means for limiting the output voltage of said compliance amplifier, said means being connected to the input of said compliance amplifier and adapted to maintain the voltage supplied thereto below a predetermined level.

10. The system of claim 9 further characterized by information output terminals from which leakage currents and breakdown voltages may be directly measured.

11. An electronic test system for providing a highly accurate source of current and voltage at preselected levels to devices under test, said system comprising:

a control amplifier having inverting and non-inverting inputs and an output;

a compliance amplifier having inverting and non-inverting inputs and an output;

feedback means connecting the output of said compliance amplifier with the inverting input of said control amplifier;

means interconnecting the output of said control amplifier to the non-inverting input of said compliance amplifier;

a first switching means for connecting said device under test to either the inverting or non-inverting input of said control amplifier;

current control means interconnecting the output of said compliance amplifier and said device under test;

a second switching means connected in series with said feedback means for opening or closing said feedback path; and means for impressing a variable voltage on the non-inverting input of said control amplifier.

12. The system of claim 11 further characterized by a negative current source connected through a first zener diode to the inverting input of compliance amplifier and through a resistor to the non-inverting input of said compliance amplifier; and a positive source of current connected through a second zener diode to the non-inverting input of said control amplifier.

13. The system of claim 12 further characterized by means for limiting the output voltage of said compliance amplifier to a predetermined value.

14. The system of claim 13 wherein said limiting means comprises a zener diode connected between ground and the non-inverting input of said compliance amplifier.

15. The system of claim 14 further characterized by output means comprising a pair of terminals for electrical connection to said device under test, one of said terminals being grounded, the other being connected to said current control means, and switching means interconnecting said terminals for shorting them together when said switch is closed.

16. The system of claim 15 wherein said current control device comprises a variable resistor.

17. The system of claim 16 wherein said feedback means is a zener diode.

18. The system of claim 17 further characterized by connector means interconnecting the output of said compliance amplifier and the inverting input thereto.

19. The system of claim 18 further characterized by a fourth switching means interconnecting the non-grounded output terminal and said control amplifier such that said control amplifier is floating when said switch means is closed.

* * * * *